C. T. RAY.
PLANTER.
APPLICATION FILED NOV. 29, 1911.
1,171,883.
Patented Feb. 15, 1916.
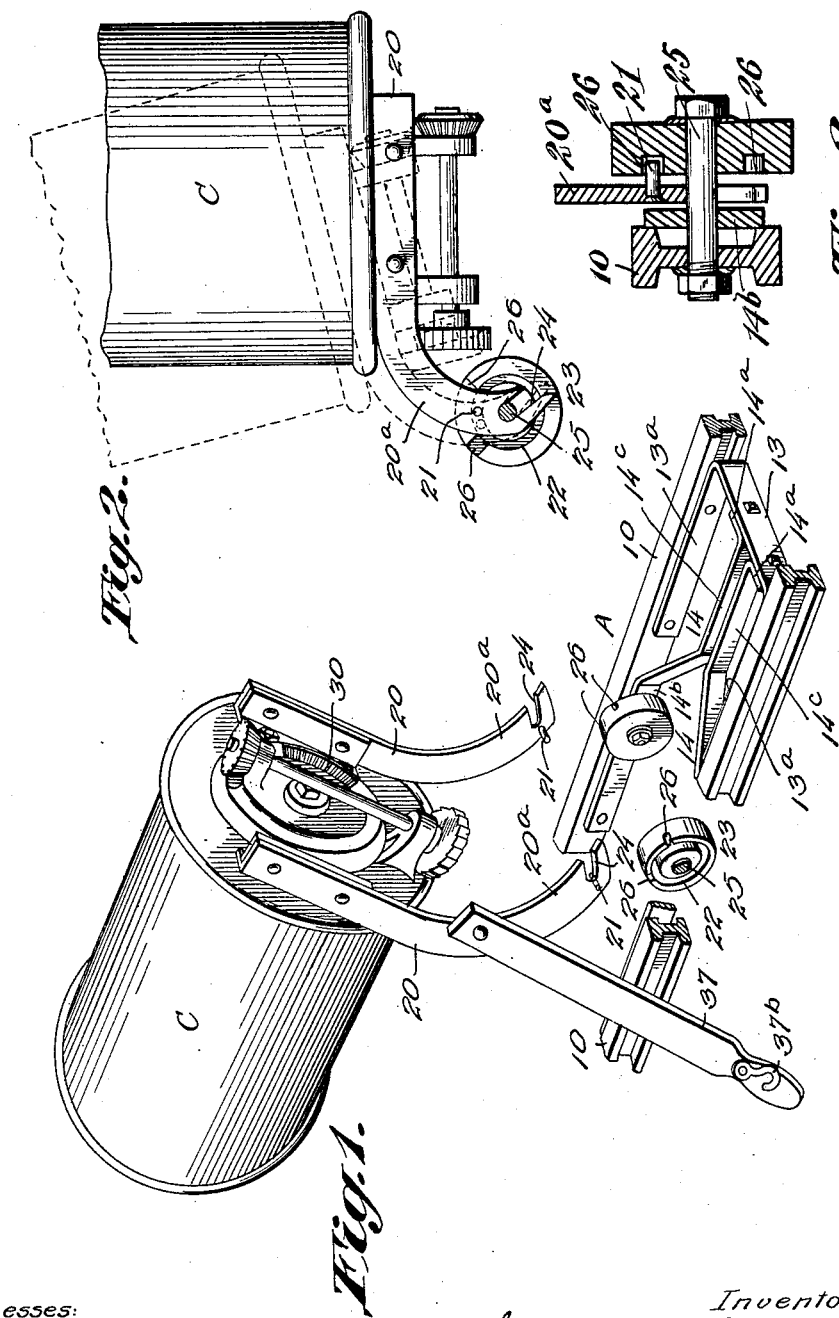
Witnesses:
L. L. Armstrong
A. Stockman.
Inventor.
Charles T. Ray
By C. J. Stockman
Attorney.

UNITED STATES PATENT OFFICE.

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

PLANTER.

1,171,883.  Specification of Letters Patent.  Patented Feb. 15, 1916.

Original application filed February 25, 1911, Serial No. 610,722. Divided and this application filed November 29, 1911. Serial No. 663,130.

*To all whom it may concern:*

Be it known that I, CHARLES T. RAY, a citizen of the United States, residing at Louisville, in the county of Jefferson and State of Kentucky, have invented new and useful Improvements in Planters, of which the following is a specification.

The present application, which forms a division of my application for Letters Patent of the United States filed February 25, 1911, Serial No. 610,722, particularly relates to an improved mounting for the hopper of a planter or other suitable implement, the most important object being to provide a hopper which is so mounted that it may be adjusted pivotally and readily applied to and removed from the frame of the implement without the use of a wrench or tool of any kind.

In the accompanying drawings I have shown what is at present regarded to be the best detail embodiment of the hopper mounting forming the present invention, but it is to be understood that changes may be made in the details of the parts without departing from the spirit of the invention or the scope of the subjoined claims.

In said drawings, wherein like characters of reference designate like parts in all the views: Figure 1, is a perespective view of the hopper and part of the frame, separated from each other; Fig. 2 is a detail view of the hopper and a bearing therefor, showing the hopper in operative position in full lines and raised to a non-feeding position in broken lines. Fig. 3 is a vertical longitudinal sectional view bi-secting one side of the frame, the bearing member connected to said side and the arm of the hopper engaging said bearing member.

10—10 designate the side members of a frame. This frame may be of any suitable construction. The one herein illustrated is provided with a cross-member 13 and a pair of longitudinal members 14—14. The cross-member 13 has flanged ends 13ª securely fastened to the members 10 and the longitudinal members 14—14 have their forward ends bent laterally, or flanged, as shown at 14ª, and secured to the bar 13. The rear portions 14ᵇ of the members 14—14 lie against the inner surfaces of the members 10—10 and are secured thereto at appropriate places. From the forward ends of these rear portions the members 14 converge forwardly and thence extend forward, in parallel spaced relation, to the flanges 14ª, as shown at 14ᶜ.

The hopper is marked C. In practice, it is preferred to provide the hopper with seed-dropping mechanism which derives movement from the driving wheel (not shown) of the implement. The herein illustrated hopper includes a bevel gear 30 which, in practice, is driven by a gear which is fixed upon a shaft carried by the frame of the implement and which shaft derives motion through suitable connections with the driving wheel. It will thus be noted that when the hopper is raised sufficiently to disconnect the gear 30 from the gear on the frame, the feeding operation is stopped, it being understood that the gear 30 is operatively connected with a seed plate or plates, or cone, or other usual or suitable means for controlling the flow of seed from the hopper. This disconnected, or non-feeding position of the hopper, is shown in broken outline in Fig. 2.

I do not consider it to be necessary more particularly to describe the seed-dropping mechanism, including the means for operating the same, for the reason that said mechanism forms no part of the present invention, and for the further reason that it will not be a departure from the spirit of the invention to disconnect the seed-dropping mechanism in any other manner than by raising the hopper. Moreover, the seed-dropping mechanism is fully disclosed in my companion application No. 610,722, hereinbefore referred to, to which reference may be had for a better understanding thereof.

The present invention particularly relates, as already stated, to means by which the hopper is pivotally supported. This means includes two bearing members 23, 23 secured respectively to the frame members 10, 10 in any suitable manner and provided with annular channels 22 and with lateral projections 25. These bearing members have their body portions spaced from the inner surfaces of the frame sufficiently to provide between them and the adjacent members of the frame room to receive the lower ends 20ª of arms 20 which are secured to the hopper and extend rearward from the latter. The ends 20ª of the arms 20 preferably are bent downward, as shown, and are formed with openings 24 which extend through the edges thereof. These openings receive the projections 25 of the respective bearing members 23, the said projections forming journals upon which the arms 20 are pivotally mounted. The portions 20ª of the arms 20 also have lateral pins 21 which enter and traverse the channels 22 in the respective bearings 23. These pins coöperate with the walls of the channel in retaining the arms in operative relation with the bearing members 23. Each bearing member 23 is further provided with one or more apertures 26 extending through its peripheral wall from its channel 22.

The correlation of the parts in the herein exemplified form of the invention is such that the hopper may be moved pivotally rearward to an approximately horizontal position, for convenience in cleaning it, or slightly tilted to its non-feeding position, hereinbefore referred to, the latter position being shown by the broken lines in Fig. 2. Between these two positions there is a place in the movement of the arms 20 in which their projections 21 are registered with the apertures 26 in the respective bearings. The hopper, when in the latter position, may be instantaneously disconnected from the bearing merely by raising it bodily therefrom; while in the other positions of the hopper, accidental disconnection of the arms from the bearings is prevented by the non-registering relations of the projections 21 and apertures 26. The means described also permit the hopper to be quickly mounted upon the frame, as is obvious.

Having now described the invention what I believe to be new and desire to secure by Letters Patent, is:—

1. In a machine of the kind described, a frame and a hopper, combined with a pivotal mounting for the hopper upon the frame, comprising interengaging members respectively formed with a projection and a channel to be traversed by the projection, the channeled element having an aperture communicating with its channel and the other member having an opening which permits it to be withdrawn from engagement with the channeled member when its projection is registered with the aperture in the latter.

2. In a machine of the kind described, a frame and a hopper, combined with a pair of bent arms attached to the hopper and having their rear ends provided with lateral projections and with openings extending through the edges of the arms, and bearing members carried by the frame and having journals to be received by the openings in the arms, channels to be traversed by said projections and apertures communicating with the channels, the parts being relatively so disposed that the arms may be freely disconnected from the bearings when their projections are alined with the apertures in the latter and are held against accidental disconnection from the bearings in other positions thereof.

3. In a machine of the kind described, a frame provided with bearings, a hopper, a pair of arms projecting from the hopper and provided with openings to engage the bearings, said openings extending through the edges of the arms to permit the arms to be disengaged from the bearings, the bearings and arms being formed with parts which coöperate in holding the arms in engagement with the bearings and permit pivotal movement of the arms upon the bearings, the bearings also having means which permit the arms to be disengaged therefrom in a predetermined position of the arms.

4. In a machine of the kind described, a frame and a hopper, a pivotal mounting for the hopper on the frame comprising interengaging members, one provided with a channel and the other with a projection to traverse the channel and to be released therefrom at a predetermined point in an arcuate adjustment of the hopper.

5. In a machine of the kind described, a frame, a bearing connected to the frame, a hopper having a member pivotally engaged with the bearing member, one of said members having a channel and the other having a projection which traverses the channel in the pivotal movement of the hopper, the channel also having an aperture which communicates with the channel and permits the projection to enter or be removed from the channel when the hopper is in predetermined position.

In testimony whereof I have hereunto set my hand in presence of two subscribing witnesses.

CHARLES T. RAY.

Witnesses:
 W. J. HUNGARLAND,
 F. M. KEDDING.